United States Patent [19]

Smith

[11] 3,931,934
[45] Jan. 13, 1976

[54] PARTICULATE MATERIAL SPREADING APPARATUS

[76] Inventor: Francis V. Smith, 3931 198 St., Langley, British Columbia, Canada, V3A 1C9

[22] Filed: Nov. 6, 1974

[21] Appl. No.: 521,279

[30] Foreign Application Priority Data
Nov. 30, 1973  Canada................................ 187073

[52] U.S. Cl. ................ 239/657; 137/330; 214/83.2; 222/504; 222/505; 239/676
[51] Int. Cl.² .................... E01C 19/20; B60P 1/16; F16K 29/02
[58] Field of Search .......... 239/101, 102, 650, 657, 239/659, 668, 670, 676, 683; 214/83.18, 83.2; 222/504, 505, 509, 198, 199, 200; 137/330

[56] References Cited
UNITED STATES PATENTS

| | | | |
|---|---|---|---|
| 1,644,575 | 10/1927 | Fitzgerald | 239/657 |
| 1,966,122 | 7/1934 | Hurt | 239/657 X |
| 2,019,502 | 11/1935 | Osgood | 222/504 |
| 2,180,044 | 11/1939 | Frank et al. | 239/657 |
| 2,268,290 | 12/1941 | Landis | 214/83.18 |
| 2,967,056 | 1/1961 | D'Amato | 239/650 X |
| 3,620,458 | 11/1971 | Rath | 239/657 |

FOREIGN PATENTS OR APPLICATIONS

| | | | |
|---|---|---|---|
| 327,965 | 4/1930 | United Kingdom | 239/659 |
| 148,142 | 12/1954 | Sweden | 239/659 |

Primary Examiner—Evon C. Blunk
Assistant Examiner—Andres Kashnikow
Attorney, Agent, or Firm—Fetherstonhaugh & Co.

[57] ABSTRACT

A dump body adapted to be hingedly mounted on a vehicle so as to be tipped upwardly towards an end of the body, outlets in the body near said end, plate valves slidably mounted to close and open the outlets, and a fluid cylinder and piston operating unit connected to the plate valves for moving the latter between positions fully opening and closing the outlets. Flingers are normally provided so as to receive the particulate material, usually sand or salt, from the outlets to spread the particulate material.

12 Claims, 8 Drawing Figures

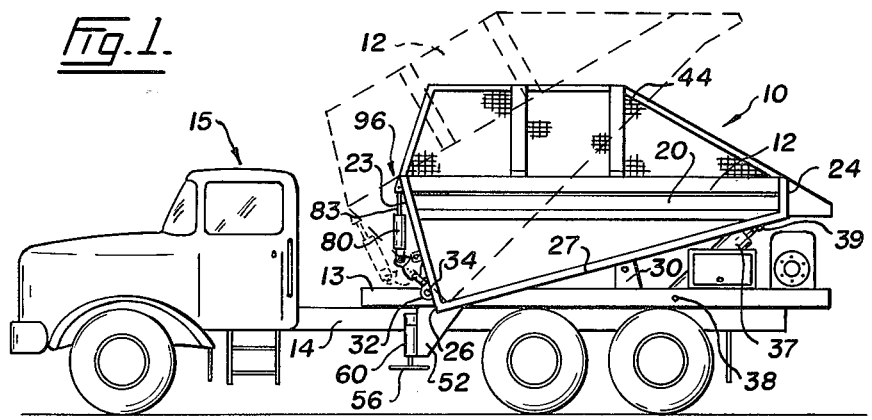
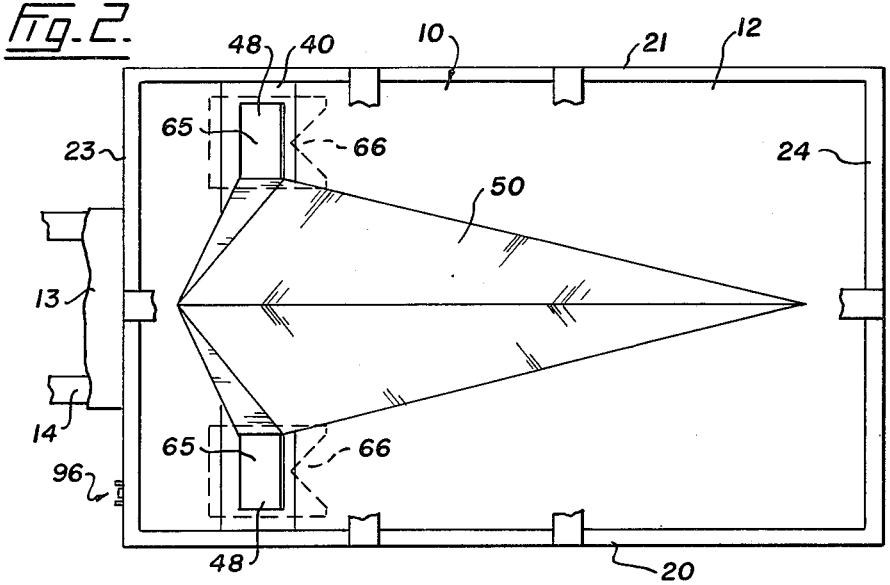
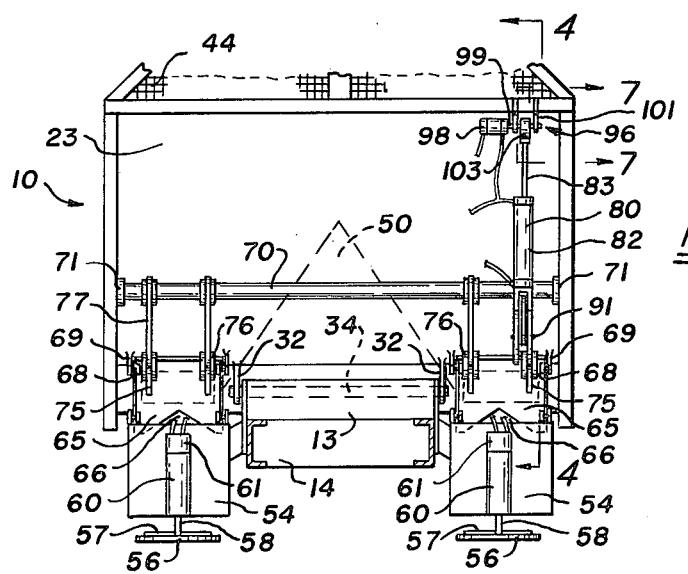

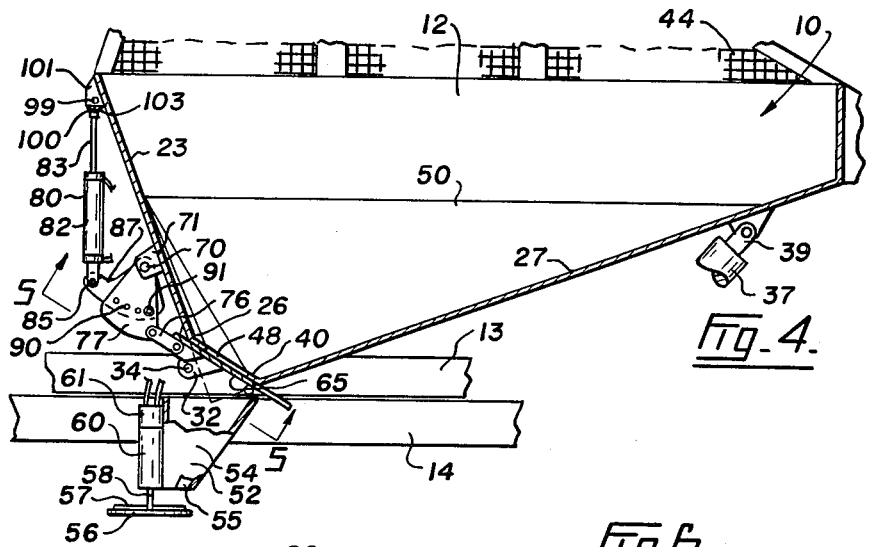
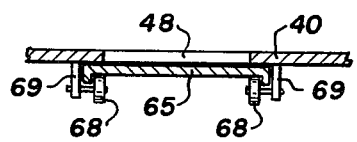
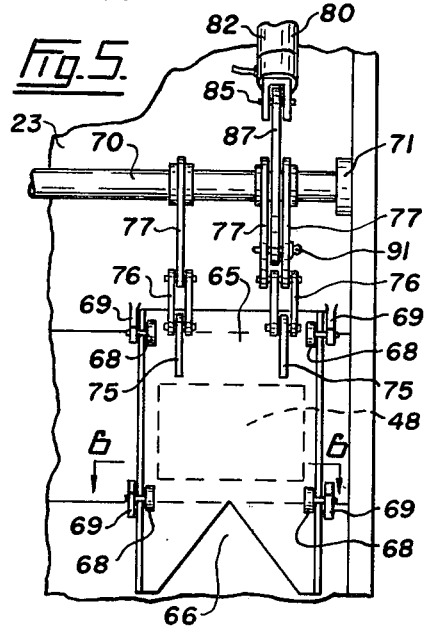
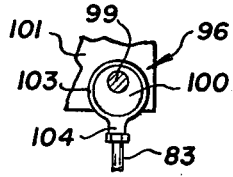
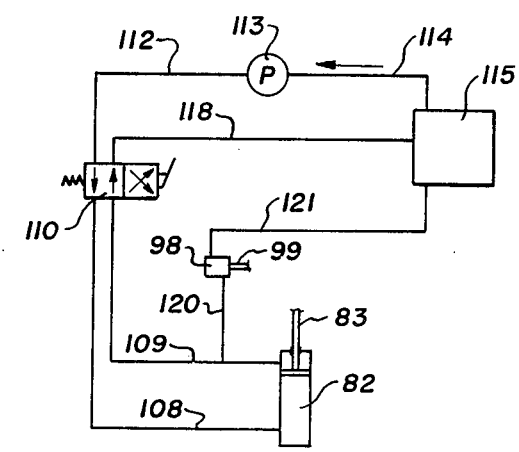

PARTICULATE MATERIAL SPREADING APPARATUS

This invention relates to apparatus for spreading particulate material whether that material be wet or dry, or contains relatively large lumps therein. The apparatus is particularly designed for spreading sand on roads, although it may be used for spreading other materials, such as salt. For the sake of convenience, the invention will be described relative to the spreading of sand.

There are numerous sand spreaders on the market which are associated with dump truck bodies. However, as the sand is usually wet and sometimes is partially frozen, the prior devices have relatively complicated mechanisms for feeding the sand to one or more flingers. Examples of equipment of this type are illustrated in U.S. Pat. Nos. 2,577,310 to E. F. Connelly, 2,697,609 to S. J. chase et al., and 3,559,893 to Gruben.

Apparatus in accordance with this invention includes a dump body adapted to be hingedly mounted on a vehicle so as to be tipped upwardly towards an end of the body, this preferably being the foward end thereof. At least one outlet is formed in the bottom of the body near the forward end thereof and there are usually two of these outlets, one near each side of the body. A plate valve is slidably mounted to close and open each outlet, and suitable means is provided for operating the plate valve or valves to shift them between positions fully opening and closing the outlets. A flinger is provided adjacent each outlet so as to receive sand from said outlet when the latter is opened and the dump body is in the tipped position.

The present apparatus feeds the sand through the outlets to the flingers by gravity and, therefore, this apparatus is much simpler than the spreaders of the prior art, it has fewer moving parts, no chain drive, augers or conveyors. The outlet and plate valve arrangement will permit rocks or lumps of the sand to pass through the outlets without damage or jamming in the outlets or the equipment. This apparatus has very simple means for quickly and easily adjusting the quantity flow through the outlet, and it includes oscillating means for ensuring even feeding of the sand. The arrangement of the various elements of this invention is such that the sand can be spread immediately ahead of the drive wheels of the vehicle on both sides thereof. The valve control means and the oscillator control means are such that they can be controlled by a single valve. Summing up, the present apparatus is very simple, trouble-free, low on maintenance and will accommodate large variations in sand and gravel size without jamming or damage. This makes it possible to utilize unscreened sand and gravel, thus eliminating the time and costs involved in prescreening the material.

Spreading apparatus in accordance with the present invention comprises a dump body for holding particulate material and adapted to be hingedly mounted on a vehicle so as to be tipped upwardly towards an end of the body, an outlet in the body near said end thereof, a plate valve slidably mounted to close and open the outlet by covering and uncovering said outlet, and operating means connected to the plate valve for moving said valve between positions fully opening and closing said outlet.

In more specific terms, the present apparatus comprises a dump body adapted to be hingedly mounted on a vehicle so as to be tipped upwardly towards an end of the body, said body having a bottom and a peripheral wall, an outlet in said bottom near each side of the body and near said end thereof, plate valves slidably mounted on the bottom positioned one near each outlet to close and open the adjacent outlet by covering and uncovering said outlet, and operating means connected to the plate valves to move said valves between positions fully opening the closing said outlets.

The spreading apparatus preferably includes means for adjusting the amount each outlet is opened by the plate valve thereof, and means for oscillating each plate valve when the valve is in the outlet opening position so as to prevent clogging at said outlet.

An example of this invention is illustrated in the accompanying drawings, in which FIG. 1 is a diagrammatic side elevation of a truck having this spreading apparatus mounted thereon, FIG. 2 is an enlarged plan view of the spreading apparatus, FIG. 3 is an elevation of the front end of the apparatus, FIG. 4 is a vertical section taken on the line 4—4 of FIG. 3, FIG. 5 is an enlarged view of a plate valve mechanism as seen from line 5—5 of FiG. 4, FIG. 6 is a cross-section taken on the line 6—6 of FIG. 5, FIG. 7 is an enlarged sectional view taken on the line 7—7 of FIG. 3, and FIG. 8 is a diagram of the hydraulic system for controlling the plate valve.

Referring to the drawings, 10 is particulate material spreading apparatus in accordance with this invention, and this apparatus includes a dump body 12 hingedly mounted on a subframe 13 which, in turn, is fixedly secured to the frame 14 of a motor vehicle or trunk 15. Body 12 has a peripheral wall in the form of side walls 20 and 21, and front and rear walls 23 and 24. In this example, front wall 23 is inclined rearwardly from its upper edge to its lower edge 26 which joins the bottom 27 of the body, said bottom sloping downwardly from rear wall 24 towards said lower edge of the front wall.

The body 12 normally rests on a support 30 carried by subframe 13, and it has lugs 32 projecting from its front wall to overlap frame 13, said lugs being journalled on a shaft 34 which extends therethrough and through the subframe, as shown in FIG. 3. Suitable means is provided for tipping body 10 forwardly when it is desired to dump the load carried thereby. In this example, a hydraulic cylinder 37 is provided for this purpose, said cylinder being swingably mounted on frame 13 by a shaft 38, and has a piston rod projecting therefrom which is swingably connected to the bottom of the body at 39. By referring to FIG. 4, it will be seen that a section 40 of bottom 27 is inclined upwardly and extends forwardly from the main portion of said bottom to the lower edge 26 of front wall 23. The angle of this section is such that when the body is tipped upwardly, this section lies in a substantially horizontal plane.

If desired, a screen 44 may be mounted on the top of the peripheral wall of the body 10, said screen being in the form of an inverted V in cross-secton. This is a rather coarse screen so that when sand is directed into the dump body, any very coarse particles, such as rocks, are screened out. If desired, screen 44 may be omitted.

In this example of the invention, outlets 48 are formed in bottom section 40 at the forward end of body 12. There is one of these outlets adjacent each of the side walls 20 and 21. Each outlet is relatively large, as clearly shown in FIG. 2. A deflector 50 is mounted on bottom 27 of the dump body and is shaped to direct sand laterally towards the two outlets 48.

A flinger 52 of known design is carried by subframe 13 beneath each outlet 48, each flinger being so positioned that when the dump body is tilted upwardly, the flinger is located immediately beneath the adjacent outlet 48.

Each flinger includes a large funnel 54 having an opening 55 in the bottom thereof, said opening being located over a flinging disc 56 having one or more vanes 57 on its upper surface. This disc is carried at the lower end of a shaft 58 projecting downwardly from a bearing unit 60, and connected to a hydraulic motor 61 at its upper end. As the hydraulic system for operating flingers 52 and for operating dump cylinder 37 are well known, they do not require description herein.

Suitable means is provided for closing and opening each outlet 48 of dump body 12. In the preferred form of this invention, this is accomplished by a plate valve 65 slidably mounted on the outer surface of bottom section 40 and lying over the adjacent outlet 48. Each plate 65 is formed with an enlarged V-shaped notch 66 in its lower or rearward ends. Each plate 65 lies on rollers 68 which are carried by lugs 69 secured to and projecting downwardly from bottom section 40 on opposite sides of outlet 48, see FIGS. 5 and 6. By referring to FIGS. 2 and 5, it will be seen that each plate valve 65 is larger than the adjacent outlet 48 so that the plate can completely cover and close said outlet. If the plate is drawn forward, its V-notch 66 gradually comes into registry with outlet 48, and this allows sand to flow through the outlet, relatively slow at first, and then increasing in flow as more of notch 66 comes into registry with the outlet.

Suitable means is provided for opening and closing outlets 48 by shifting plate valves 65 back and forth to uncover and cover these outlets. A shaft 70 is provided for this purpose, and shaft being journalled in bearings 71 carried by front wall 23, see FIG. 3. Suitable linkage is provided between this shaft and the plates 65 so as to move these plates when the shaft is rotated. In this example, the linkage of each plate consists of a pair of lugs 75 secured to the plate and projecting downwardly therefrom, said lugs being connected by links 76 to a pair of arms 77 which are fixedly secured to and extend downwardly from shaft 70. When the shaft is rotated in one direction, these arms 77 swing outwardly and upwardly to draw outwardly valve 65 secured thereto through links 76 and lugs 75, and when the shaft is rotated in the opposite direction, the plate is moved downwardly.

A hydraulic cylinder unit 80 is provided for rotating shaft 70. This unit includes a hydraulic cylinder 82 having a piston rod 83 projecting from an end thereof. The lower end of cylinder 82 is suitably connected at 85 to a relatively wide arm 87 which is swingably mounted on and projects downwardly from shaft 70. The adjacent arm 77 also is relatively wide, see FIG. 4, and overlaps arm 87. These two arms are provided with a plurality of holes 90, and pin 91 extends through registering holes of the two arms to secure these arms together. These arms can be angularly adjusted relative to each other by removing the pin and inserting it through another pair of holes.

The outer end of piston rod 83 can be connected directly to wall 23 of the dump body, but it is preferable to insert an oscillating unit 96 between the piston rod and the dump body. Unit 96 includes a hydraulic motor 98 having a power shaft 99 upon which a cam 100 is eccentrically mounted, see FIG. 7. Motor 98 is mounted on wall 23, and shaft 99 extends through bearings carried by lugs 101 which are mounted on this wall. Cam 100 rotates eccentrically within a ring 103 which has a socket 104 projecting therefrom into which piston rod 83 fits. When oscillating unit 96 is in operation, oscillations or vibrations are transferred through cylinder unit 80, and the linkages to the two plates 65.

FIG. 8 illustrates an example of a hydraulic system for operating the plate valves 65. Lines 108 and 109 extend from opposite ends of cylinder 82 to a hydraulic control valve 110 of well-known design. The pressure line 112 connects this valve to a pump 113 which, in turn, is connected by a line 114 to a reservoir 115, while a return line 118 connects the control valve to the reservoir. A pressure line 120 extends from line 109 to hydraulic motor 98, and a return line 121 connects this motor to the reservoir.

When control valve 110 is in the setting shown in FIG. 8, hydraulic fluid is pumped into the lower end of cylinder 82, and as piston rod 83 is fixed against movement relative to the cylinder, the cylinder moves downwardly, and through the linkages closes outlets 48 by moving plate valves 65 downwardly. When the control valve is reversed, pressure line 112 is connected to line 109, and return line 118 is connected to line 108. At this time pump 113 directs the hydraulic fluid under pressure to the upper end of cylinder 82 and to motor 98 of the operating unit. This shifts cylinder 82 upwardly to move plates 65 to open outlets 48. At the same time, oscillating unit 96 is in operation so that the plate valves are oscillated or vibrated relative to their respective outlets in order to assist the movement of sand through these outlets.

The effect of the movement of cylinder 82 on the movement of plates 65 can be adjusted by removing pin 91 and shifting arms 77 and 87 relative to each other. The setting shown in FIG. 4, when these arms completely overlap each other, results in plates 65 being moved completely to open outlets 48. The reason for this is that cylinder 82 is in its lowermost position so that when fluid is pumped into the upper end of the cylinder, it moves through a full stroke. If the arms 77 and 87 are shifted to reduce the overlap thereof, cylinder 82 is moved upwardly relative to its piston so that the cylinder will move only through a partial stroke, thereby moving the plate valves only sufficiently to partially uncover the outlets.

The opeation of apparatus 10 is relatively simple. Dump body 12 is normally in its "down" position for loading and travelling purposes, and when it is desired to start spreading the sand contained in the dump body, the latter is tipped to a raised or forward position, as shown in broken lines in FIG. 1. At this time, outlets 48 are directly over flingers 52, and when control valve 110 is operated to cause plate valves 65 completely or partially to open the outlets, the sand flows through these outlets on to the flinger discs 56 which are rotated by their respective motors 61. These spread the sand laterally relative to the truck. The sloping bottom 27 of the dump body and the deflector 50 directs the sand to the outlets. These outlets are relatively large, and as plates 65 are vibrated or oscillated while they are in their open positions, vibrations or oscillations are transferred to the bottom of the dump body and directly to the sand to help the flow thereof through the outlets. If some relatively large stones are in the sand, they still will flow through the outlets without obstructing them.

The operating system of this apparatus is quite simple, and makes it possible to tip dump body 12 forwardly for the dumping or spreading operation. This makes it possible to locate flingers 52 ahead of the rear or drive wheels of the vehicle so that they have the advantage of the sanding operation when this takes place on slippery or icy roads.

I claim:

1. Spreading apparatus comprising a dump body for holding particulate material and adapted to be hingedly mounted on a vehicle so as to be tipped upwardly towards and end of the body, an outlet in the body near said end thereof, a plate valve slidably mounted to move back and forth in a longitudinal direction across the outlet to close and open siad outlet, operating means connected to the plate valve for moving said valve back and forth between positions fully opening and closing said outlet, and oscillating means connected to the valve plate for oscillating said plate in said longitudinal direction when the valve is in an outlet opening position.

2. Spreading apparatus as claimed in claim 1 including means in said operating means for adjusting the amount of said outlet is opened by the plate valve each time the operating means is operated.

3. Spreading apparatus as claimed in claim 1 including a material flinger positioned to receive the particulate material flowing from the body through the outlet thereof.

4. Spreading apparatus as claimed in claim 1 including walls in the body around the outlet and sloping towards said outlet for directing the particulate material towards the outlet.

5. Spreading apparatus as claimed in claim 1 in which said operating means comprises a fluid cylinder and piston operating unit having one end connected to the body, linkage extending from the opposite end of said unit to the plate valve, arm means in said linkage and swingably mounted on the body for causing back and forth movement of the valve plate under action of the operating unit, and control means for selectively directing fluid to the unit cylinder to move said arm means and thereby control the opening and closing of said outlet by the plate valve.

6. Spreading apparatus as claimed in claim 5 including means for extending and shortening said linkage to adjust the amount said outlet is opened by the unit cylinder.

7. Spreading apparatus comprising a dump body for holding particulate material and adapted to be hingedly mounted on a vehicle so as to be tipped upwardly towards an end of the body, said body having a bottom and a peripheral wall, an outlet in said bottom near each side of the body and near said end thereof, plate valves slidably mounted on the bottom positioned one near each outlet to close and open the adjacent outlet by covering and uncovering said outlet, operating means connected to the plate valves to move said valves between positions fully opening and closing said outlets, and oscillating means connected to said operating means for oscillating therethrough the plate valves relative to the outlets when the plates are in outlet opening positions.

8. Spreading apparatus as claimed in claim 7 including means in said operating means for adjusting the amount of said oulets are opened by the plate valves each time the operating means is operated.

9. Spreading apparatus as claimed in claim 7 in which said operating means comprises a fluid cylinder and piston operating unit having one end connected to the body, linkage extending from the opposite end of said unit to the plate valves, arm means in said linkage and swingably mounted on the body for causing back and forth movement of the valve plate under action of the operating unit, and control means for selectively directing fluid to the unit cylinder to move said arm means and thereby control the opening and closing of said outlet by the valve plates.

10. Spreading apparatus as claimed in claim 9 including means for extending and shortening said linkage to adjust the amount said outlets are opened by the unit cylinder.

11. Spreading apparatus as claimed in claim 7 in which said oscillating means comprises an oscillator connected to said operating means for oscillating therethrough the plate valves relative to the outlets when the plates are in outlet opening positions, and a fluid-operated motor connected to and powering said oscillator.

12. Spreading apparatus as claimed in claim 7 in which said operating means comprises a fluid cylinder and piston operating unit having one end connected to the body, linkage extending from the opposite end of said unit to the plate valve, an oscillator connected to the operating unit for oscillating therethrough the valve plates relative to the outlets when the plates are in outlet opening positions, a fluid-operated motor connected to and powering said oscillator, and control means for simultaneously directing fluid to the unit cylinder and said motor to open the outlets and to oscillate the plate valves.

\* \* \* \* \*